United States Patent
Werner et al.

(10) Patent No.: US 11,910,498 B2
(45) Date of Patent: Feb. 20, 2024

(54) PANE HAVING AN ELECTRICAL CONNECTION ELEMENT AND CONNECTION CABLE

(71) Applicant: SAINT-GOBAIN GLASS FRANCE, Courbevoie (FR)

(72) Inventors: Katja Werner, Simmerath (DE); Bernhard Reul, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 814 days.

(21) Appl. No.: 16/979,706

(22) PCT Filed: Jun. 12, 2019

(86) PCT No.: PCT/EP2019/065281
§ 371 (c)(1),
(2) Date: Sep. 10, 2020

(87) PCT Pub. No.: WO2020/001977
PCT Pub. Date: Jan. 2, 2020

(65) Prior Publication Data
US 2021/0045197 A1 Feb. 11, 2021

(30) Foreign Application Priority Data

Jun. 26, 2018 (EP) .................................... 18179698

(51) Int. Cl.
*H05B 3/84* (2006.01)
*B23K 1/00* (2006.01)
*B23K 101/38* (2006.01)

(52) U.S. Cl.
CPC ............. *H05B 3/84* (2013.01); *B23K 1/0008* (2013.01); *B23K 2101/38* (2018.08); *H05B 2203/016* (2013.01)

(58) Field of Classification Search
CPC ...... H05B 3/84; H05B 2203/016; H05B 3/03; H05B 2203/017; B23K 1/0008; B23K 2101/38
See application file for complete search history.

(56) References Cited

U.S. PATENT DOCUMENTS 3,616,122 A 10/1971 Orcutt et al.
4,878,850 A 11/1989 Letemps et al.
(Continued)

FOREIGN PATENT DOCUMENTS

CN 101065993 A 10/2007
CN 103262645 A 8/2013
(Continued)

OTHER PUBLICATIONS

International Search Report as issued in International Patent Application No. PCT/EP2019/065281, dated Aug. 12, 2019.

*Primary Examiner* — Michael C Zarroli
(74) *Attorney, Agent, or Firm* — Pillsbury Winthrop Shaw Pittman LLP

(57) ABSTRACT

A pane has an electrical connection element and connection cable including a substrate, an electrically conductive structure on a region of the substrate, wherein the connection cable has, on its lower face facing the substrate, a contact region, in which a conductor track of the connection cable is connected to the region of the electrically conductive structure, the connection element is rigid and has a first flat region for contacting the connection cable, the connection element with the conductor track of the connection cable on an upper face of the connection cable facing away from the substrate is electrically conductively connected to the connection cable via a weld region, the contact region of the connection cable and the first flat region of the connection element are arranged one above the other such that the flat (Continued)

region of the connection element is provided for transferring heat to the soldering compound.

17 Claims, 5 Drawing Sheets

(56) References Cited

U.S. PATENT DOCUMENTS

| | | | | |
|---|---|---|---|---|
| 2007/0105412 | A1* | 5/2007 | Hoepfner | C22C 1/11 |
| | | | | 439/83 |
| 2014/0060921 | A1* | 3/2014 | Reul | H01Q 1/1271 |
| | | | | 29/601 |
| 2015/0296569 | A1 | 10/2015 | Rateiczak et al. | |

FOREIGN PATENT DOCUMENTS

| | | |
|---|---|---|
| CN | 104620673 A | 5/2015 |
| CN | 104782225 A | 7/2015 |
| CN | 105556752 A | 5/2016 |
| CN | 106463845 A | 2/2017 |
| EP | 0 490 723 A1 | 6/1992 |
| EP | 0 593 940 A1 | 4/1994 |
| EP | 1 488 972 A1 | 12/2004 |
| JP | H07-329724 A | 12/1995 |
| JP | 2016-503568 A | 2/2001 |
| KR | 10-2006-005966 A | 1/2006 |
| KR | 10-2013-0066655 A | 6/2013 |
| RU | 144837 U1 | 9/2014 |
| WO | WO 2009/074267 A1 | 6/2009 |
| WO | WO 2020/001977 A1 | 1/2020 |

\* cited by examiner

PANE HAVING AN ELECTRICAL CONNECTION ELEMENT AND CONNECTION CABLE

CROSS-REFERENCE TO RELATED APPLICATIONS

This application is the U.S. National Stage of PCT/EP2019/065281, filed Jun. 12, 2019, 2018, which in turn claims priority to European patent application number 18179698.8 filed Jun. 26, 2018. The content of these applications are incorporated herein by reference in their entireties.

FIELD

The invention relates to a pane having an electrical connection element and connection cable, a method for production thereof, and use thereof.

BACKGROUND

Vehicle windows having an electrically conductive structure are well-known. They are used in particular as rear windows, in which the conductive structure is, for example, implemented as a heating conductor or antenna conductor. These conductive structures are customarily connected to a supply voltage and on-board electronics via soldered-on electrical connection elements. The panes can be prefabricated with the connection element. At the time of installation in the vehicle body, the connection elements can then be very simply and time-savingly connected with the connection cables to the supply voltage and the on-board electronics, in particular by means of a plug connection.

The connection element can be a rigid element that is soldered in the form of a current connection bridge onto a connection surface of the conductive structure. An example of a rigid connection element with a plug connection is known from EP 1488972 A2. The rigid connection element has the disadvantage that at the time a connection cable is plugged in, shearing or leverage forces that strain the solder connection between the connection element and the pane can occur. Flexible connection elements are used to minimize the mechanical stresses when the connection cable is being plugged in. The flexible connection elements are provided with a plug connection at one end and can thus be connected to the vehicle-side connection cable.

The soldering of the connection element is done with a so-called stamp, thermode, induction, resistance, or hot-air soldering method. In the case of thermode soldering, current is conducted through a thermode. The thermode is designed such that it has a small cross-section in the working area and has high electrical resistance at this point. This results in high heating in this area. Due to low thermal mass, this region can also cool down again quickly. The thermode is in direct contact with the solder joint, which can result in contamination and wear. Since the production of a pane with a flexible connection element requires an increased cycle time of the production process, the aim is to standardize the operations.

EP 0 593 940 A1 discloses a composite glass pane with metal wires embedded in the thermoplastic intermediate layer, a plug-in contact element, and a connection cable connecting the plug-in contact element to the metal wires. The connection cable is designed as a ribbon cable provided with an insulating sheath. One end section of the ribbon cable is connected between the individual glass panes to the metal wires and is embedded in the thermoplastic intermediate layer. The ribbon cable is guided around the peripheral surface of the glass pane in contact therewith. The other end section of the ribbon cable is on the outer side of the glass pane and is bonded to it.

SUMMARY

The object of the present invention is to make available a pane with an electrical connection element and a connection cable, by means of which the aforementioned disadvantages can be avoided. In addition, the pane should be easy to manufacture in industrial production.

The object of the present invention is accomplished according to the invention by a pane with an electrical connection element and connection cable in accordance with claim 1. Preferred embodiments emerge from the dependent claims.

The pane according to the invention having an electrical connection element and connection cable comprises at least one substrate, an electrically conductive structure on a region of the substrate, wherein the connection cable has, on its lower face facing the substrate, a contact region, in which a conductor track of the connection cable is connected to the region of the electrically conductive structure, the connection element is rigid and has a first flat region for contacting the connection cable, the connection element with the conductor track of the connection cable on an upper face of the connection cable facing away from the substrate is electrically conductively connected to the connection cable via a weld region. The arrangement of the first flat region of the connection element is selected such that the flat region and the contact region of the connection cable are arranged one above the other. The flat region of the connection element is provided for transferring heat to the soldering compound.

As a result of the arrangement of the flat region above the contact region, the flat region of the connection element can be heated easily by means of a soldering device. A device for induction, resistance, or hot air soldering can be used. The inventive idea now is not to melt the soldering compound by direct contact with the soldering device, but, instead, by heat transfer from the first flat region of the connection element to the soldering compound. The first flat region of the connection element is situated between a soldering device and the soldering compound. In this way, the soldering compound arranged in the contact region can be easily heated during production of the pane.

The solder contact is achieved by melting the soldering compound, which produces an electrically conductive connection between the connection cable and the electrically conductive structure at the time of subsequent cooling or solidification. The first flat region of the connection element heats the soldering compound, so long as heat is applied to the flat region of the connection element. Regardless of the soldering method used, with such an arrangement of the connection element, heat input can occur until the soldering compound liquefies and an electrical contact between the connection element and the electrically conductive structure is produced.

The pane according to the invention is preferably provided in a window opening of a vehicle to separate the interior from the external surroundings. The term "interior" can mean the vehicle's passenger compartment.

The connection cable is provided for electrical contacting, preferably as a flexible connection cable. This connection cable connects the electrically conductive structure on the substrate to the connection element. For this, the connection cable preferably has a first section, a second section, and a fold, with the first section and the second section arranged one above the other such that the fold runs transverse to the longitudinal extension of the connection cable. For this purpose, the first section and section section run substantially parallel to one another.

Such connection cables are also referred to as "flat conductors", "foil conductors", or "ribbon conductors". "Foil conductor" means an electrical conductor whose width is significantly greater than its thickness. Such a foil conductor is, for example, a strip or band containing or made of copper, tinned copper, aluminum, silver, gold, or alloys thereof. The foil conductor has, for example, a width from 2 mm to 16 mm and a thickness from 0.03 mm to 0.1 mm. The foil conductor can have an insulating, preferably polymer sheath, for example, based on polyimide. Foil conductors that are suitable for contacting electrically conductive coatings or structures in panes have a total thickness of, for example, only 0.3 mm. Such thin foil conductors can be simply and aesthetically arranged and glued, for example, on the inner-side surface. One foil conductor band can include multiple conductive layers electrically isolated from one another. The connection cable can also be a so-called "flat flex cable" (FFC) or FPC connector. FPC connectors are flexible printed circuit boards intended for connecting electronic assemblies.

The substrate preferably contains glass, particularly preferably soda lime glass. The substrate is preferably a glass pane, in particular a window glass pane. The substrate can, in principle, also contain other types of glass, for example, quartz glass or borosilicate glass. In another preferred embodiment, the substrate contains a polymer, in particular polycarbonate or polymethyl methacrylate. Due to the weight savings, polymer materials are increasingly of interest for window panes. The substrate can also contain other polymers, for example, polyethylene, polypropylene, polystyrene, polybutadiene, polynitriles, polyesters, polyurethane, polyvinyl chloride, polyacrylate, polyamide, or polyethylene terephthalate.

The substrate is preferably transparent or translucent. The substrate preferably has a thickness from 0.5 mm to 25 mm, particularly preferably from 1 mm to 10 mm, and most particularly preferably from 1.5 mm to 5 mm.

The electrically conductive structure according to the invention preferably has a layer thickness from 5 µm to 40 µm, particularly preferably from 5 µm to 20 µm, most particularly preferably from 8 µm to 15 µm, and in particular from 10 µm to 12 µm. The electrically conductive structure according to the invention preferably contains silver, particularly preferably silver particles and glass frits.

In a preferred embodiment, the soldering compound is lead-free. This is particularly advantageous in terms of environmental compatibility of the pane according to the invention having an electrical connection element. In the context of the invention, "lead-free soldering compound" means a soldering compound that contains, in compliance with EC Directive "2002/95/EC on the Restriction of the Use of Certain Hazardous Substances in Electrical and Electronic Equipment", a content less than or equal to 0.1 wt.-% lead, preferably no lead.

The soldering compound preferably contains tin and bismuth, indium, zinc, copper, silver, or compositions thereof. The tin content in the solder composition according to the invention is from 3 wt.-% to 99.5 wt.-%, preferably from 10 wt.-% to 95.5 wt.-%, particularly preferably from wt.-% to 60 wt.-%. The content of indium, zinc, copper, silver, or compositions thereof is, in the solder composition according to the invention, from 0.5 wt.-% to 97 wt.-%, preferably wt.-% to 67 wt.-%, while the content of indium, zinc, copper, or silver can be 0 wt.-%. The solder composition can contain nickel, germanium, aluminum, or phosphorus with a content from 0 wt.-% to 5 wt.-%. The solder composition according to the invention most particularly preferably contains In97Ag3, Sn95.5Ag3.8Cu0.7, Sn77.2In20Ag2.8, Sn95Ag4Cu1, Sn99Cu1, Sn96.5Ag3.5, Sn96.5Ag3Cu0.5, Sn97Ag3, or mixtures thereof.

In an advantageous embodiment, the soldering compound contains from 90 wt.-% to 99.5 wt.-% tin, preferably from 95 wt.-% to 99 wt.-%, particularly preferably von 93 wt.-% to 98 wt.-%. In addition to tin, the soldering compound preferably contains from 0.5 wt.-% to 5 wt.-% silver and from 0 wt.-% to 5 wt.-% copper.

The layer thickness of the soldering compound is preferably less than or equal to $6.0\times10^{-4}$ m, particularly preferably less than $2.0\times10^{-4}$ m.

The connection element includes the first flat region and, preferably, a transition region as well as a second flat region on its end away from the connection cable. The connection element is a rigid, solid component. The transition region of the connection element preferably has a length of at least 30% of the length of the connection element.

In a preferred embodiment, the connection element contains at least steel or copper, a copper-containing alloy, for example, electrolytic copper. Such a connection element has advantageously high electrical conductivity.

In another embodiment, the connection element is implemented in one piece. This increases the stability of the connection element, which has a positive effect particularly at the time of final installation of the pane in a vehicle. The material thickness of the connection element is preferably from 0.1 mm to 2 mm, particularly preferably from 0.2 mm to 1.5 mm, most particularly preferably from 0.4 mm and 1 mm, for example, 0.8 mm. However, the connection element can, in principle, also have multiple pieces, i.e., consist of two or more rigid individual parts connected to one another.

In another embodiment, the connection element forms a pitch angle (a) with the transition region relative to the connection cable. The pitch angle (a) is 30° to 90°.

The dimensions of the connection element can be freely selected by the person skilled in the art depending on the requirements of the individual case. The connection element has, for example, a length and a width from 1 mm to 50 mm. The length of the connection element is preferably from 10 mm to 30 mm, particularly preferably from 20 mm to 25 mm. The width of the connection element is preferably from 1 mm to 30 mm, particularly preferably from 2 mm to 12 mm. Connection elements with these dimensions are particularly easy to handle and are particularly suitable for electrical contacting of conductive structures having a connection cable on panes.

In a preferred embodiment, the connection element is attached to the connection cable by means of a welded connection. This is advantageous since a welded connection can be made quickly and economically such that established industrial processes need not be changed.

In another preferred embodiment, the connection element is provided on the second flat region for contacting on a voltage source. The connection element preferably has, on the second flat section, a plug or cable. The length of the connection element is determined by the circumstance.

The invention also includes a method for producing a pane according to the invention having an electrical connection element and connection cable, wherein at least the connection element is connected, on an upper face of
a connection cable, via a weld region to the connection
cable,
a soldering compound is applied in a contact region on a
lower face of the connection cable facing away from
the upper face,
the connection cable with soldering compound is arranged
on an electrically conductive structure on a substrate of
the pane and is fixed on the substrate by means of an
adhesive,
the connection cable is electrically conductively connected to the electrically conductive structure by means
of the soldering compound under the introduction of
heat.

In a preferred embodiment of the method according to the
invention, a first flat region of the connection element is
heated, with the soldering compound being melted and the
connection cable being soldered.

The thermal energy is introduced by means of a resistive
or inductive soldering method or by hot air. In the resistive
soldering method (resistance soldering method), an electrical current is fed through two electrodes and the connection
element to heat the connection element. The electrodes lie
on the connection element until the soldering compound
melts.

Another aspect of the invention includes the use of a pane
according to the invention in buildings or in means of
transportation for travel on land, in the air, or on water, in
particular in motor vehicles or rail vehicles, preferably as a
windshield, rear window, side window, and/or roof panel, in
particular as a heatable pane or a pane with antenna function.

It is understood that the features mentioned above and
explained in detail in the following can be used not only in
the combinations and configurations indicated, but also in
other combinations and configurations, or in isolation, without departing from the scope of the present invention.

BRIEF DESCRIPTION OF THE DRAWINGS

The invention is explained in detail with reference to
drawings and exemplary embodiments. The drawings are a
schematic representation and not to scale. The drawings in
no way restrict the invention.

They depict.

DETAILED DESCRIPTION

Figure 1:
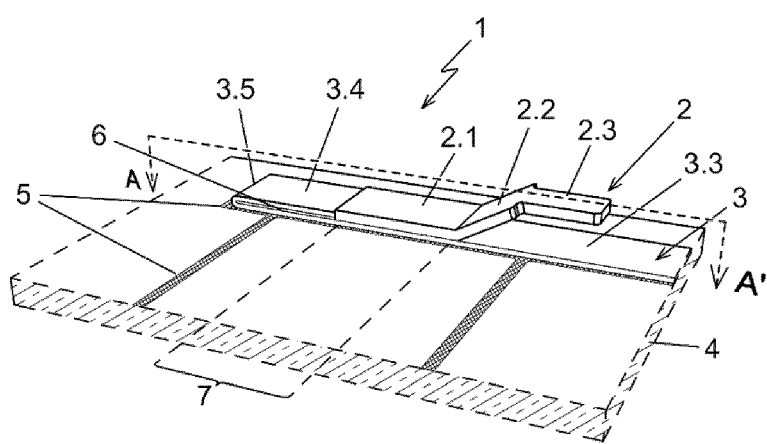
FIG. 1 a representation of the pane according to the
invention having an electrical connection element and connection cable,
FIG. 2 a cross-sectional representation along the section
line A-A' through the pane of FIG. 1 during soldering by
resistance soldering,
FIG. 3 a cross-sectional representation along the section
line A-A' through the pane of FIG. 1 during soldering by
induction soldering,
FIG. 4 a cross-sectional representation along the section
line A-A' through the pane of FIG. 1 during soldering by
hot-air soldering
FIG. 5 a flowchart of an embodiment of the method
according to the invention.

FIG. 1 depicts a plan view of a pane 1 according to the
invention having an electrical connection element 2 and
connection cable 3. The pane 1 includes a substrate 4 that is
provided with an electrically conductive structure 5. The
substrate 4 is a thick thermally tempered single-pane safety
glass or thin laminated glass of soda lime glass. The substrate 4 has, for example, a width of 150 cm and a height of
80 cm and is provided as a window of a passenger car. The
electrically conductive structure 4 forms a heating field on a
surface of the substrate 4. The electrically conductive structure 4 contains silver particles and glass frits. The electrically conductive structure 2 is widened slightly in the edge
region of the pane 1 and forms a connection surface. The
pane 1 further includes a connection cable 3 and a connection element 2.

The connection cable 3 is a flexible ribbon cable. This
connection cable 3 connects the electrically conductive
structure 5 on the substrate 4 to the connection element 2.
For this, the connection cable 3 has a first section 3.3, a
second section 3.4, and a fold 3.5, wherein the first section
3.3 and the second section 3.4 are arranged one above the
other. The first section 3.3 and the second section 3.4 run
parallel to one another and are glued together by adhesive 6.
The adhesive 6 is a double-sided adhesive tape which
ensures a permanent adhesive connection between the first
section 3.3 and the second section 3.4. Additional adhesives
6 are situated on a lower surface of the connection cable 3.
The lower surface of the first section 3.3 of the connection
cable 3 faces the substrate 4 and is fixedly bonded to the
substrate 4 by adhesive 6.

Such connection cables 3 are also referred to as "flat
conductors", "foil conductors", or "ribbon conductors".
"Foil conductor" means an electrical conductor track whose
width is significantly greater than its thickness. Such a foil
conductor is, for example, a strip or band containing or made
of copper, tinned copper, aluminum, silver, gold, or alloys
thereof. The foil conductor has, for example, a width from
2 mm to 16 mm and a thickness from 0.03 mm to 0.1 mm.
The foil conductor can have an insulating, preferably polymer sheath, for example, based on polyimide.

The connection cable 3 includes at least one conductor
track 3.1 that is surrounded by an insulating polymer film
3.2. On its lower face facing the substrate 1, the connection
cable 3 has a contact region 7. The polymer film 3.2 has been
partially removed in the contact region 7 such that the
conductor track 3.1 of the connection cable 3 is electrically
contacted via a soldering compound 8 with the region of the
electrically conductive structure 5.

The soldering compound 8 effects a permanent electrical
and mechanical connection between the connection cable 3
and the electrically conductive structure 5. The soldering
compound 8 is lead-free and consists of 96.5 wt.-% tin, 3
wt.-% silver, and 0.5 wt.-% copper. The soldering compound
8 has a thickness of 150 μm.

The connection element 2 is rigid and has a first flat region
2.1. The connection element 2 is not directly connected to
the electrically conductive structure 5 via the soldering
compound 8. The first flat region 2.1 electrically contacts the
connection cable 3. Moreover, the connection element 2
includes a transition region 2.2 and a second flat region 2.3.
The transition region 2.2 connects the first flat region 2.1 to
the second flat region 2.3. The transition region forms a pitch
angle α relative to the connection cable 3 or to the substrate
surface. The pitch angle α is, for example, approx. 35°.

The second flat region 2.3 is situated at an end of the
connection element 2 facing away from the connection cable
3. The second flat region 2.3 is provided for contacting to a
voltage source. For this, the connection element 2 has, on the
second flat region 2.3, a plug that is implemented as a
standardized motor vehicle flat plug. The connection element 2 has, for example, a length of 11 cm, a width of 1 cm,
and a material thickness of 1.8 mm. The connection element 2 is electrically connected to the connection cable 3 via a welded connection in a weld region 13.

After installation of the prefabricated pane 1 having a connection cable 3 and connection element 2 in a vehicle body, the electrical contacting can be done. For this, a connection cable is plugged onto the plug of the connection element 2.

Figure 2:
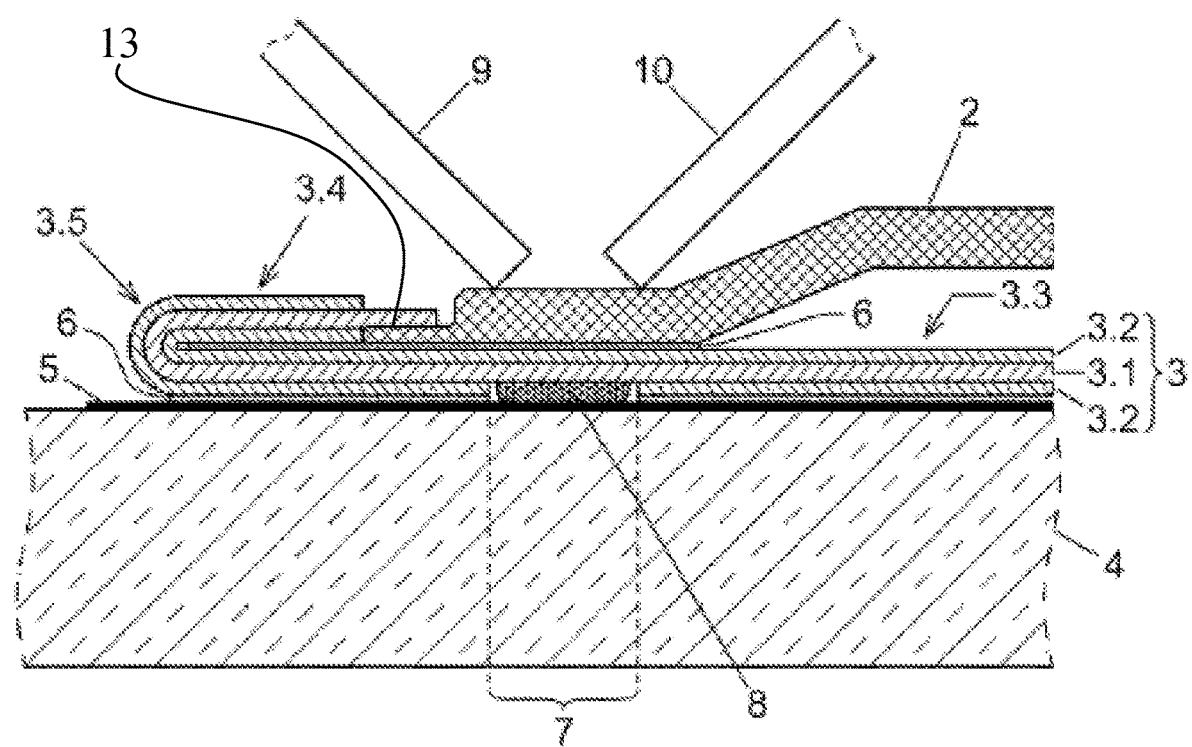

FIG. 2 depicts a cross-sectional representation along the section line A-A through the pane of FIG. 1 in the region of the connection cable 3 during soldering by resistance soldering. The substrate 4, the electrically conductive structure 5, the connection element 2, connection cable 3, and the soldering compound 8 are designed as in the above exemplary embodiment.

Before installation of the prefabricated pane 1, the connection cable 3 with the soldering compound 8 is arranged on an electrically conductive structure 5 on a substrate 4 of the pane 1 and fixed on the substrate 4 by means of an adhesive 6. After fixing the connection cable 3 and connection element 2 on the substrate 4, the electrical contacting is done. For this, two electrodes 9, 10 touch the first flat region 2.1 of the connection element 2 with their electrode ends. In each case, one electrode 9,10 is placed in the edge region of the first flat region 2.1. The electrodes 9, 10 are spaced apart essentially by the length of the first flat region 2.1 and arranged on two opposite edge regions. Thus, an electrical soldering current is routed through the first flat region 2.1. This causes resistance heating in the first flat region 2.1. The heat generated in the first flat region 2.1 is transferred to the soldering compound 8. This heat transfer causes melting of the soldering compound 8, creating a solder contact between the connection cable 3 and the electrically conductive structure 5.

The solder contact between the connection cable 3 and the electrically conductive structure 5 is achieved by melting the soldering compound 8. During the subsequent solidification of the soldering compound 8, an electrically conductive connection is produced between the connection cable 3 and the electrically conductive structure 5.

Figure 3:
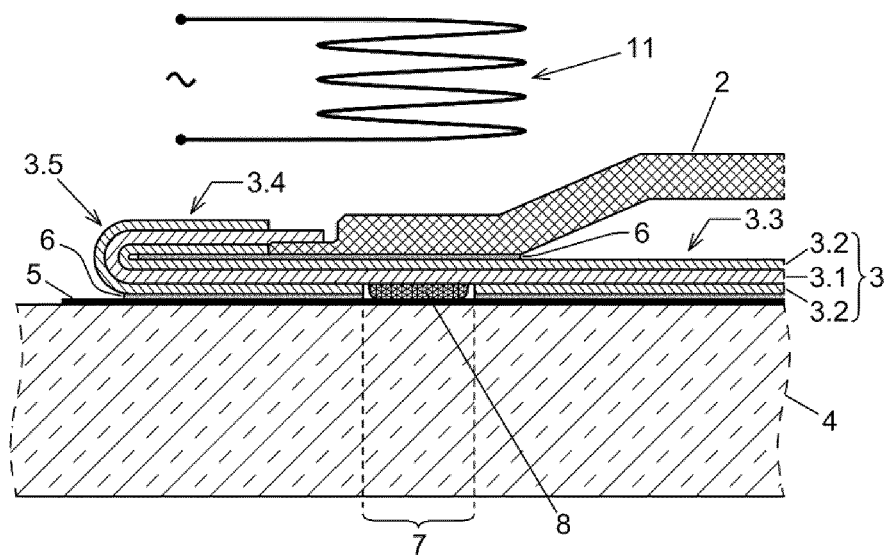

FIG. 3 depicts a cross-sectional representation along the section line A-A through the pane of FIG. 1 in the region of the connection cable 3 during soldering by induction soldering.

The electrical contacting of the connection cable 3 and connection element 2 on the substrate 4 can be done by induction, as an alternative to resistance soldering. The induction soldering method is characterized in that a current-carrying coil 11 generates a magnetic field. The coil 11 is arranged at a small distance from the first flat region 2.1 in the immediate vicinity of the connection element 2. The magnetic field generated by the coil penetrates the first flat region 2.1 of the connection element 2. The first flat region 2.1 of the connection element 2 is heated by induction currents. The heat generated in the first flat region 2.1 is transferred to the soldering compound 8. This heat transfer causes melting of the soldering compound 8, creating a solder contact between the connection cable 3 and the electrically conductive structure 5.

The frequency of the AC voltage applied to the coil is 5 to 50 kHz and can be adapted to the shape, volume, and material of the first flat region 2.1 or the soldering compound 8. In principle, inductive soldering offers the advantage that the heat is generated without contact and directly.

Figure 4:
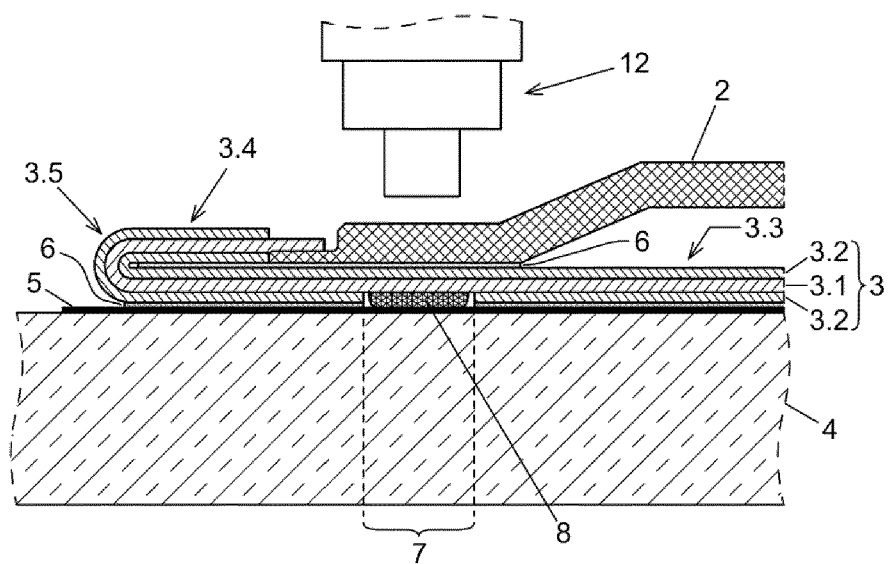

FIG. 4 depicts a cross-sectional representation along the section line A-A through the pane of FIG. 1 in the region of the connection cable 3 during soldering by the hot-air soldering method.

The electrical contacting of the connection cable 3 and connection element 2 on the substrate 4 can be done by hot-air, as an alternative to resistance soldering. For this, the first flat region 2.1 of the connection element 2 is heated by a hot air nozzle 12 arranged above the first flat region 2.1. The heat generated in the first flat region 2.1 is transferred to the soldering compound 8. This heat transfer causes melting of the soldering compound 8, creating a solder contact between the connection cable 3 and the electrically conductive structure 5.

Figure 5:
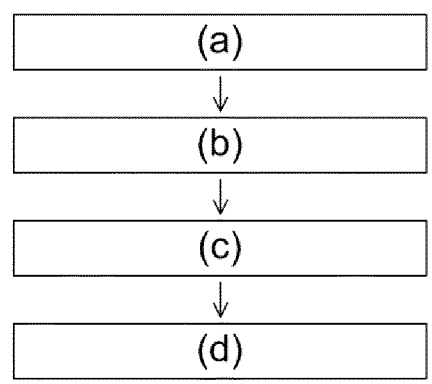

FIG. 5 depicts an exemplary embodiment of the method according to the invention for producing a pane 1 having an electrical connection element 2 and connection cable 3 with reference to a flowchart. The method according to the invention comprises, for example, the following steps:

the connection element 2 is connected, on an upper face of the connection cable 3, to the connection cable 3 via a weld region, the soldering compound 8 is applied in the contact region 7 on a lower face of the connection cable 3 facing away from the upper face, the connection cable 3 is arranged with soldering compound 8 on the electrically conductive structure 5 on the substrate 4 of the pane 1 and is fixed on the substrate 4 by means of the adhesive 6, the connection cable 3 is electrically conductively connected to the electrically conductive structure 5 by means of the soldering compound 8 under the introduction of heat.

LIST OF REFERENCE CHARACTERS 1 pane
2 connection element
2.1 first flat region of the connection element
2.2 transition region of the connection element
2.3 second flat region of the connection element
3 connection cable
3.1 conductor track of the connection cable
3.2 polymer film of the connection cable
3.3 first section of the connection cable
3.4 second section of the connection cable
3.5 fold of the connection cable
4 substrate
5 electrically conductive structure
6 adhesive
7 contact region
8 soldering compound
9 electrode
10 electrode
11 coil
12 hot air nozzle
13 weld region
A-A' section line

The invention claimed is:

1. A pane having an electrical connection element and connection cable at least comprising:

a substrate, an electrically conductive structure on a region of the substrate, wherein the connection cable has, on its lower face facing the substrate, a contact region, in which a conductor track of the connection cable is connected to a portion of the electrically conductive structure, the connection element is rigid and has a first flat region for electrically contacting the connection cable, the connection element with the conductor track of the connection cable on an upper face of the connection cable facing away from the substrate is electrically conductively connected to the connection cable via a weld region, the contact region of the connection cable and the first flat region of the connection element are arranged one above the other such that the flat region of the connection element is provided for transferring heat to a soldering compound provided in the contact region that connects the conductor track of the connection cable to the portion of the electrically conductive structure.

2. The pane according to claim 1, wherein the connection cable has a first section, a second section, and a fold, in which the first section and the second section are arranged one above the other.

3. The pane according to claim 1, wherein the connection cable is flat and flexible and the conductor track contains at least one metal foil.

4. The pane according to claim 1, wherein the connection element contains at least copper, a copper-containing alloy, or steel.

5. A method for producing a pane according to claim 1, wherein the connection element is connected, on an upper face of a connection cable, via a weld region to the connection cable, a soldering compound is applied in a contact region on a lower face of the connection cable facing away from the upper face, the connection cable with soldering compound is arranged on an electrically conductive structure on a substrate of the pane and is fixed on the substrate by means of an adhesive, the connection cable is electrically conductively connected to the electrically conductive structure by means of the soldering compound under the introduction of heat.

6. The method according to claim 5, wherein a first flat section of the connection element is heated such that the soldering compound is melted and the connection cable is soldered.

7. The method according to claim 5, wherein a resistive or inductive soldering method or hot air is used.

8. A method comprising utilizing a pane according to claim 1 in buildings or in means of transportation for travel on land, in the air, or on water.

9. The method according to claim 8, wherein the pane is in a motor vehicle or a rail vehicle.

10. The method according to claim 8, wherein the pane is a windshield, a rear window, a side window, and/or roof panel.

11. The method according to claim 8, wherein the pane is a heatable pane.

12. A pane having an electrical connection element and connection cable at least comprising:
a substrate,
an electrically conductive structure on a region of the substrate,
wherein
the connection cable has, on its lower face facing the substrate, a contact region, in which a conductor track of the connection cable is connected to a portion of the electrically conductive structure,
the connection element is rigid and has a first flat region for contacting the connection cable,
the connection element with the conductor track of the connection cable on an upper face of the connection cable facing away from the substrate is electrically conductively connected to the connection cable via a weld region,
the contact region of the connection cable and the first flat region of the connection element are arranged one above the other such that the flat region of the connection element is provided for transferring heat to a soldering compound provided in the contact region,
wherein the connection element has
a transition region and
a second flat region at its end facing away from the connection cable.

13. The pane according to claim 12, wherein the transition region of the connection element has a length of at least 30% of the length of the connection element.

14. The pane according to claim 12, wherein the connection element with the transition region has a pitch angle in the range of 30° to 90° relative to the connection cable.

15. The pane according to claim 12, wherein the second flat region is configured to contact a voltage source.

16. The pane according to claim 12, wherein the second flat region has a plug or a cable.

17. A pane having an electrical connection element and connection cable at least comprising:
a substrate,
an electrically conductive structure on a region of the substrate,
wherein
the connection cable has, on its lower face facing the substrate, a contact region, in which a conductor track of the connection cable is connected to a portion of the electrically conductive structure,
the connection element is rigid and has a first flat region for contacting the connection cable,
the connection element with the conductor track of the connection cable on an upper face of the connection cable facing away from the substrate is electrically conductively connected to the connection cable via a weld region,
the contact region of the connection cable and the first flat region of the connection element are arranged one above the other such that the flat region of the connection element is provided for transferring heat to a soldering compound provided in the contact region,
wherein the connection element is formed in one piece.

* * * * *